United States Statutory Invention Registration [19]

[11] Reg. Number: H77

[45] Published: Jul. 1, 1986

Yao et al.

[54] LOW LOSS, SINGLE-MODE PLANAR WAVEGUIDE

[75] Inventors: Shi-Kay Yao, Anaheim; Joseph W. Niesen, Placentia, both of Calif.

[73] Assignee: The United States of America as represented by the Secretary of the Army, Washington, D.C.

[21] Appl. No.: 481,125

[22] Filed: Apr. 1, 1983

[51] Int. Cl.[4] ..... G02B 6/10

[52] U.S. Cl. ..... 350/96.12; 350/96.11

[58] Field of Search ..... 350/96.10, 96.11, 96.12, 350/96.13, 96.14, 96.34; 65/3.3, 3.31, 17, 60.1, 60.5, 60.8, 32, 30.1

[56] References Cited

U.S. PATENT DOCUMENTS

| | | | |
|---|---|---|---|
| 3,856,494 | 12/1974 | Kitano et al. | 350/96.34 |
| 3,880,630 | 4/1975 | Izawa | 350/96.12 |
| 3,947,089 | 3/1976 | Rapp | 350/96.34 |
| 4,183,620 | 1/1980 | Macedo et al. | 350/96.34 |
| 4,188,198 | 2/1980 | Macedo et al. | 350/96.33 |
| 4,206,251 | 6/1980 | Chen | 350/96.12 |
| 4,329,016 | 5/1982 | Chen | 350/96.12 |

FOREIGN PATENT DOCUMENTS

| | | | |
|---|---|---|---|
| 53-34536 | 3/1978 | Japan | 65/32 |

OTHER PUBLICATIONS

Boyd et al, "An Integrated Optical Waveguide and Charge-Coupled Device Image Array", IEEE Journal of Quantum Electronics, vol. QE-13, No. 4 April 1977, pp. 282-287.

Boyd et al, "Fabrication of Optical Waveguide Taper Couplers Utilizing $SiO_2$", Applied Optics, vol. 18, No. 4, 15 Feb. 1979, pp. 506-509.

Gottlieb et al, "Out-of-Plane Scattering in Optical Waveguides", IEEE Transations on Circuits and Systems, vol. CAS-26, No. 12, Dec. 1979, pp. 1029-1035.

Dutta et al, "Extremely Low-loss Glass Thin-film Optical Waveguides Utilizing Surface Coating and Laser Annealing", Journal of Applied Physics, vol. 52, No. 6, June 1981, pp. 3873-3875.

Butusov et al, "Optical Waveguides on $SiO_2$ Substrates . . . " Applied Phys. vol. 21 No. 2 2/80 pp. 159-162.

*Primary Examiner*—S.C. Buczinski

*Assistant Examiner*—Linda J. Wallace

*Attorney, Agent, or Firm*—John H. Raubitschek; Francis A. Cooch; Freddie M. Bush

[57] ABSTRACT

A low loss optical waveguide is provided by taking a silicon substrate with a silicon dioxide waveguide thereon and depositing lead on the air interface surface of the silicon dioxide. The lead is then oxidized and diffused into the silicon dioxide creating a high optical quality, high index region at the air interface of the waveguide. This allows transmitted waveguide light energy directed into the silicon dioxide to be transmitted in the lead oxide diffused portion of the waveguide keeping the energy away from the lossy silicon substrate, and thereby providing a low loss planar waveguide.

10 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

LOW LOSS, SINGLE-MODE PLANAR WAVEGUIDE

DEDICATORY CLAUSE

The invention described herein may be manufactured, used, and licensed by or for the Government for governmental purposes without the payment to us of any royalties thereon.

BACKGROUND OF THE INVENTION

In a planar optical waveguide it is common for a substrate material to support an isolation material which in turn supports the waveguide material. Light propagating through the waveguide may be coupled through the isolation material into the lossy substrate. This is a common occurance when the substrate has a high refractive index such as with silicon (Si), gallium-arsenide (GaAs), or lithium niobate ($LiNbO_3$). Therefore, the thickness of the isolation material must be made sufficient so that the effect of the substrate on waveguide mode properties is low. Typically, for a glass waveguide, a silicon dioxide ($SiO_2$) thickness of approximately 1 $\mu$m has been considered sufficient thickness to substantially provide isolation. Ideally, it is desirable for rays of light to be propagated in the waveguide at angles that provide total internal reflection from both of the waveguide film surfaces. This does not always occur, however, due to such factors as roughness on the isolation material or waveguide interface surfaces, or from inhomogenities within the waveguide, for example. Thus some energy associated with the rays will be transmitted to the substrate or escape into the air during transmission and can significantly reduce the beam strength at the output end of the waveguide. The low loss planar waveguide reduces these power losses, providing a high optical quality path for transmitted light rays.

SUMMARY OF THE INVENTION

A planar, optical, single mode waveguide is provided which has an optical path located to transmit light energy through the waveguide while substantially keeping the energy away from the lossy silicon substrate, thereby reducing losses in the waveguide. A $SiO_2$ waveguide is deposited on a silicon substrate to provide a single-mode, thermally oxidized silicon waveguide. A layer of lead deposited on the exposed $SiO_2$ surface is oxidized and then diffused into the $SiO_2$ to provide the low loss waveguide in the high index diffused medium.

DESCRIPTION OF THE PREFERRED EMBODIMENT

Figure 1:
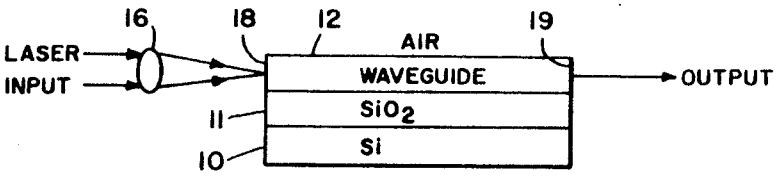
FIG. 1 (PRIOR ART)
FIG. 1 is a view of a typical prior art planar waveguide.

Referring now to the drawings wherein like numbers refer to like parts, FIG. 1 shows a prior art single mode, planar waveguide wherein a silicon (Si) substrate 10 has a silicon dioxide ($SiO_2$) isolation layer 11 thereon. A glass waveguide 12 lies on top of isolation layer 11. The surface 14 of waveguide 12 interfaces with the air. In a typical operation, a laser input beam is focused by lens 16 into an input end 18 of waveguide 12. The laser beam energy coupled through the waveguide is output from end 19 and coupled to responsive circuitry (not shown). Some of the input energy escapes from the waveguide through isolation layer 11 into the substrate or escapes into the air as out-of-plane scattering losses.

Figure 2:
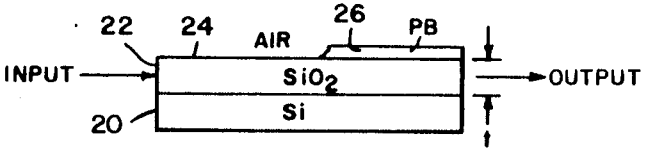
FIG. 2 is a diagrammatic view of a single mode, planar waveguide with lead oxide deposited on one surface thereof.

As shown in FIG. 2 an optical, planar waveguide with extremely low scattering can be formed on silicon 20 by forming an oxide 22 thereon. The oxide 22 is from 4 to 10 microns of thickness (t) of silicon dioxide. The silicon wafer forming substrate 20 may be that which is in common usage in electronics manufacturing. In this simple form only two layers exist, the silicon substrate and the $SiO_2$ waveguide. An air interface lies next to the surface 24 of the waveguide. A layer of lead 26 shown partially covering surface 24 has not been deposited at this time. This waveguide structure is lossy due to the $SiO_2$ layer being in direct contact with the lossy silicon substrate 20, which absorbs the light. This lossiness has been measured at approximately 3 dB per centimeter by destructive means - breaking the waveguide substrate into shorter lengths. To reduce such lossiness the layer 26 of lead (Pb) is evaporated to a thickness of 300 angstroms (A), completely covering the surface 24 of a $SiO_2$ waveguide. After 33 hours of room air oxidation at 300 degrees centigrade the resulting layer 26 becomes lead oxide. The assembly is then placed in an argon environment and extended diffusions of 16 hours at 500 degrees centigrade and 15½ hours at 800 degrees centigrade are made. This sequence of oxidation and diffusion reproducibly creates a low loss, single-mode, planar waveguide as shown in FIG. 3.

Figure 3:
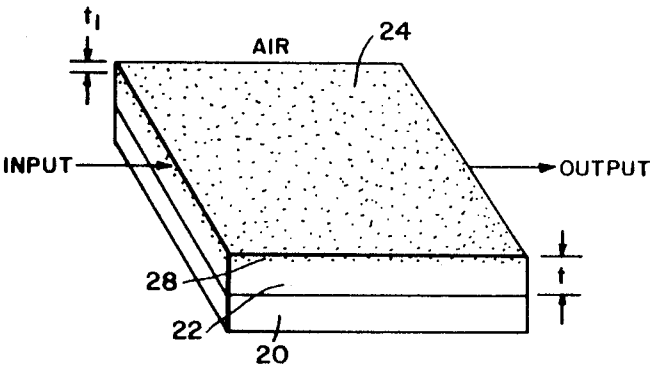
FIG. 3 is a diagrammatic view of the waveguide of FIG. 2 with the lead oxide diffused into the waveguide.

FIG. 3 shows the waveguide 22 with a diffusion region 28 across the air interface surface 24 thereof, all of the PbO being diffused into the $SiO_2$. Diffusion region 28 may extend a distance or thickness $t_1$ of approximately 1–2 microns into silicon dioxide waveguide 22. A minimum separation ($t-t_1$) of approximately 3 microns between the inner surface of diffusion region 28 and the interface between lossy substrate 20 and waveguide 22 allows an input optical beam or ray of light to be coupled through the diffusion layer 28 of the waveguide 22 to the output without reaching the lossy substrate. Thus for a waveguide 22 thickness of 4 microns, the diffusion layer 28 would be 1 micron. For a thickness of 5 or more microns, the diffusion layer would be approximately 2 microns.

Figure 4:
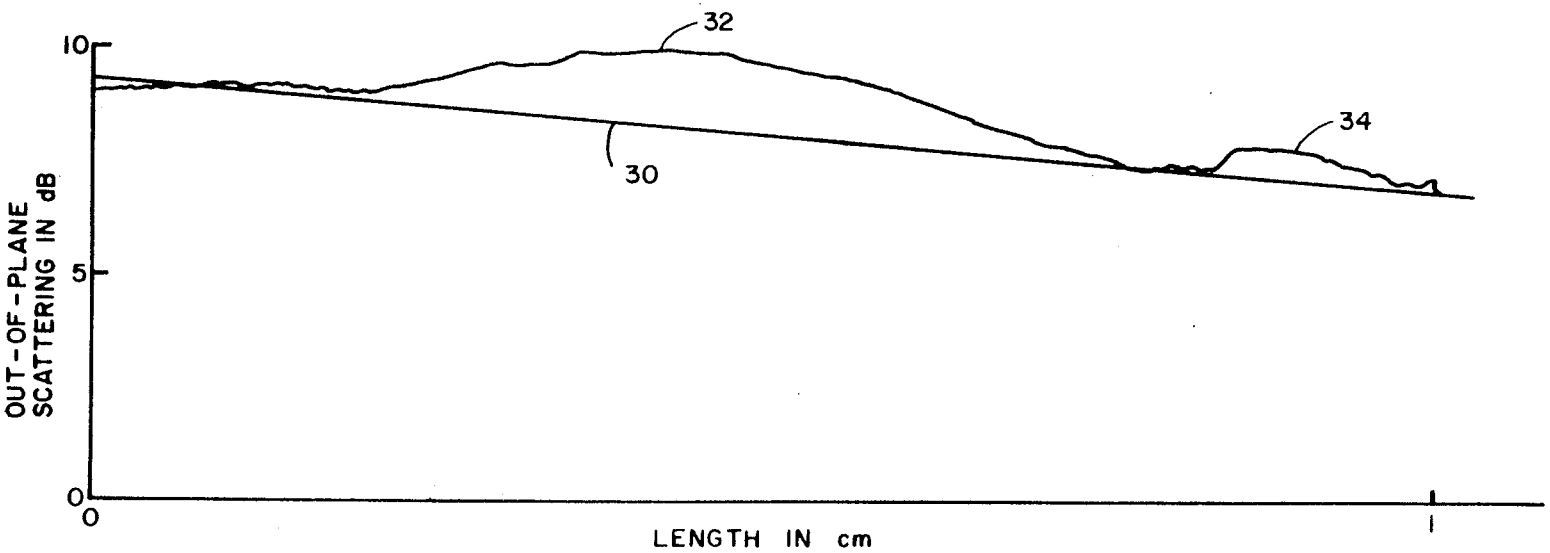
FIG. 4 is a graph of out-of-plane scattering loss as a function of distance along the low loss waveguide of FIG. 3.

FIG. 4 shows an actual plot of out-of-plane scattering loss into air as a function of distance along a waveguide having a diffused region 28 such as that of FIG. 3. FIG. 4 discloses a 1.5 dB per centimeter loss for the PbO diffused waveguide. The signal variation between the input end and the output end is due to localized scattering centers. The curve shows a gradual reduction in scattered light. A tangent line 30 drawn for the minimum regions is an indication of waveguide loss; and shows approximately 1–1.5 dB/cm loss. The peaks 32 and 34 on high portions of the curve appear to be in surface areas where the PbO diffusion was not as uniform as the surrounding areas, resulting in locally strong scattering. Even with this local scattering, the loss at peak 34 is considerably less than that at peak 32. The output losses were picked up with a surface probe moved along the air interface surface 24 of the waveguide.

A high optical quality, high refractive index diffused region is created near the air-silicon dioxide interface of the waveguide which allows proper reconstruction of the energy distribution in the waveguide. The low loss single-mode guide is thus provided, within the passive $SiO_2$ material, which tends to keep the rays of light away from the lossy active element, silicon substrate. The light path in the diffusion region is thus effectively shifted toward the air interface which is less lossy than the substrate.

Although a particular embodiment and form of the invention has been illustrated, it will be apparent to those skilled in the art that modification may be made without departing from the scope and spirit of the foregoing disclosure. Therefore it should be understood that the invention is limited only by the claims appended hereto.

We claim:

1. A method of making a single-mode planar waveguide comprising the steps of:

depositing a layer of high index refractive material as a substrate, thermally oxidizing a layer of silicon dioxide onto a surface of said substrate for providing a single-mode waveguide thereon, depositing a layer of lead on to the exposed surface of said silicon dioxide waveguide, oxidizing said lead, and uniformly diffusing all of said oxidized lead a predetermined distance into said silicon dioxide waveguide less than two-fifths of the thickness of the waveguide.

2. A method of making a single-mode planar waveguide as set forth in claim 1 and further comprising the step of:

depositing said layer of lead by evaporating a layer of lead 300 angstroms thick across the surface of said silicon dioxide layer, and oxidizing said lead by room air oxidation for 33 hours at 300 degrees centigrade.

3. A method of making a single-mode planar waveguide as set forth in claim 2 wherein the step of thermally oxidizing produces a selectable layer that is from 4 microns thick to 10 microns thick.

4. A method of making a single-mode planar waveguide as set forth in claim 3 wherein the step of diffusing produces a diffused region of a depth of only one micron into said silicon dioxide waveguide.

5. A method of making a single-mode planar waveguide as set forth in claim 3 wherein the step of diffusing said oxidized lead leaves at least a minimum separation of 3 microns between the inner surface of the silicon dioxide adjoining the substrate surface and the inner surface of the diffused oxidized lead.

6. A method of making a single-mode planar waveguide as set forth in claim 2 wherein the step of diffusing is carried out by subjecting said oxidized lead to an argon environment for at least 16 hours at 500 degrees centigrade.

7. A planar waveguide comprising: a high refractive index silicon substrate material; a thermally oxidized silicon layer of waveguide forming an isolation layer, said layer having first and second surfaces, and said first surface being disposed on the silicon substrate material; said oxidized silicon layer having a substantially uniform thickness of at least 4 microns; and a lead oxide region diffused into the second surface of the oxidized silicon layer, said diffused region having a substantially uniform thickness at least 3 microns less than the thickness of the oxidized silicon layer.

8. A planar waveguide as set forth in claim 7 wherein said diffused region has a substantially uniform thickness of from 1 to 2 microns.

9. A planar waveguide as set forth in claim 8 wherein said oxidized silicon layer is not more than 10 microns thick and said diffused lead oxide region is not more than 2 microns thick.

10. A method of making a single-mode planar waveguide comprising the steps of:

depositing a layer of high index refractive material as a substrate, thermally oxidizing a layer of silicon dioxide onto a surface of said substrate for providing a single-mode waveguide thereon, depositing a layer of lead 300 angstrons thick across the exposed surface of said silicon dioxide layer, oxidizing said lead by room air oxidation for 33 hours at 300 degrees centigrade, subjecting the oxidized lead to a flowing argon environment for 16 hours at 500 degrees centigrade and for 15½ hours at 800 degrees centigrade and thereby producing a uniformly diffused region of oxidized lead a predetermined distance into said silicon dioxide waveguide less than two-fifths of the thickness of the waveguide.

* * * * *